(12) United States Patent
Neykov

(10) Patent No.: US 6,867,703 B2
(45) Date of Patent: Mar. 15, 2005

(54) SAFETY-PROTECTION CIRCUIT

(76) Inventor: Yulian Neykov, 130 Lawrence Ave East, Toronto (CA), M4N 1S8

(*) Notice: Subject to any disclaimer, the term of this patent is extended or adjusted under 35 U.S.C. 154(b) by 0 days.

(21) Appl. No.: 10/431,660

(22) Filed: May 9, 2003

(65) Prior Publication Data
US 2004/0113806 A1 Jun. 17, 2004

Related U.S. Application Data

(63) Continuation-in-part of application No. 09/743,253, filed as application No. PCT/CA99/00393 on Apr. 30, 1999.

(51) Int. Cl.[7] .............................................. G08B 21/00
(52) U.S. Cl. .................... 340/680; 340/691.1; 340/641; 340/642; 361/1
(58) Field of Search ................................. 340/680, 679, 340/691.1, 691.8, 649, 650, 500, 635, 641, 642; 361/1, 49, 50

(56) References Cited

U.S. PATENT DOCUMENTS

| | | | | |
|---|---|---|---|---|
| 4,089,031 A | * | 5/1978 | Stevens | 361/50 |
| 4,626,834 A | * | 12/1986 | Caruthers | 340/649 |
| 4,722,021 A | * | 1/1988 | Hornung et al. | 361/49 |
| 5,357,179 A | * | 10/1994 | Abbagnaro et al. | 318/17 |
| 6,236,177 B1 | * | 5/2001 | Zick et al. | 318/362 |

* cited by examiner

Primary Examiner—Toan N. Pham

(57) ABSTRACT

In the process of drilling a concrete in a building, many times contact and damage can accidentally be made with existing electrical conduit and the wires inside, or plumbing pipes. This damage can be avoided with a device which can indicate a grounded metal, such as a conduit, plumbing pipes, supporting frames or metal beam, all of which may be grounded to the existing electrical system. A safety protection circuit is incorporated into a power tool and includes at least one LED indicator connected to a low voltage power supply and to the body of the power tool to be illuminated when contact with grounded metal occurs.

9 Claims, 2 Drawing Sheets

SAFETY-PROTECTION CIRCUIT

Figure 1:
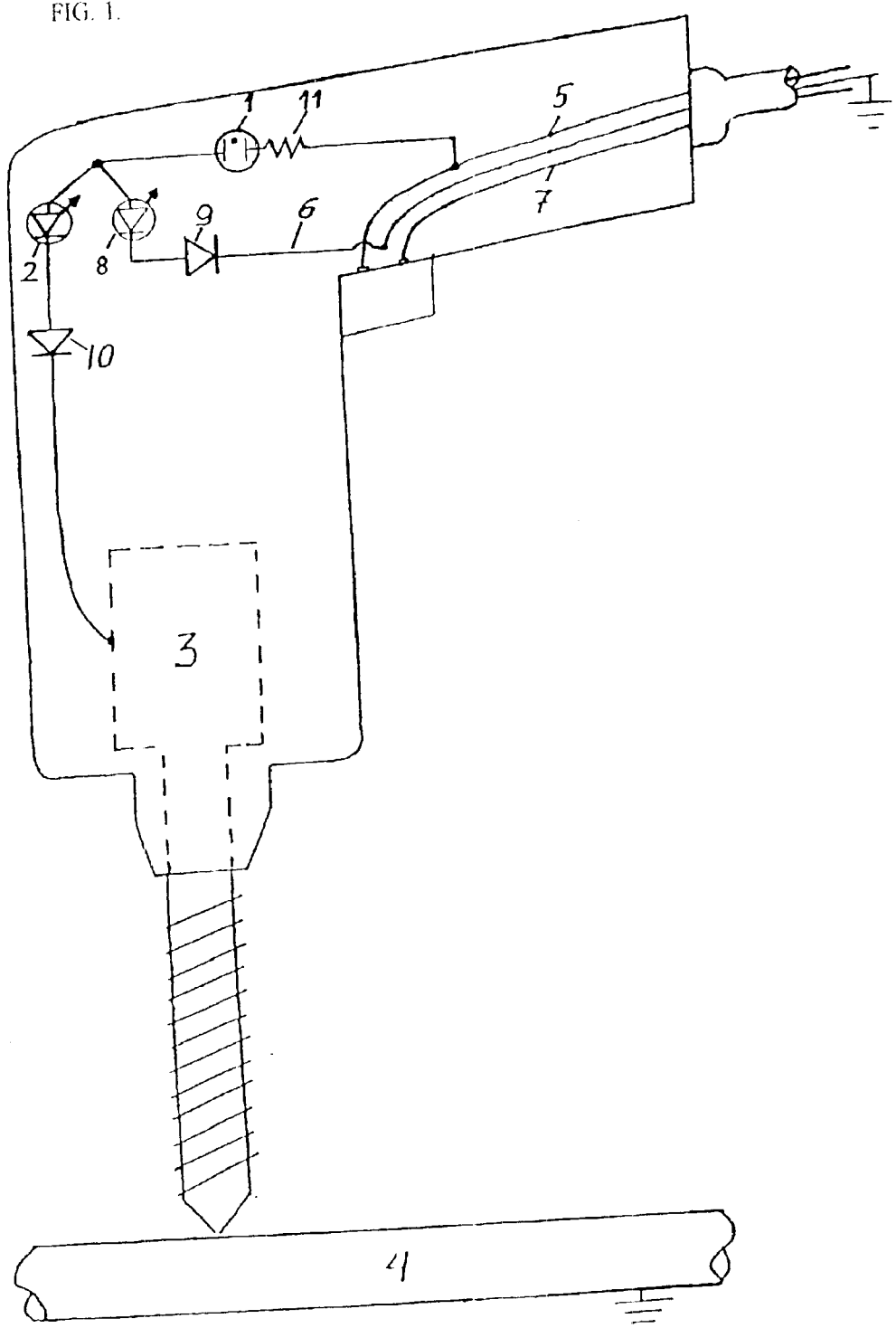

This application is a cip of Ser. No. 09/743,253 filed Mar. 7, 2001 which is a 371 of PCT/CA99/00393 filed Apr. 30, 1999.

This invention relates to a device for indicating ground metal contact for use with an electrically operated power tool.

BACKGROUND OF THE MOTION

U.S. Pat. No. 4,089,031 of Stevens issued 1978 is known, relating to—"Safety Protection-Circuit".

That patent teaches a power supply, three conductors (a hot wire, a neutral wire, a building ground wire), a step-down transformer, a primary winding (connected across the hot wire and the neutral wire), secondary winding (connected across the input of a bridge rectifier), and a fuse (interconnected between the hot wire and one side of me primary winding). The hot wire is also connected to one input of a ground fault interrupter circuit and a contact of a momentary push-button switch is provided, the neutral wire is tied to the second input terminal of the interrupter circuit and to one side coil of a relay which has five sets of contacts. The red indicator (red lamp) will become extinguished since the contact will be opened and the green indicator (green lamp) will light via the closure of the contact to indicate that the drill is ready for operation. Upon the event of the drill bit making contact with an electrically grounded conductive material, such as a metallic conduit carrying electrical cables therein which is beneath the concrete floor, the relay will become energized through the conductor which is connected to the housing ground of the drill. The switch on the drill is in its off-position. The red indicator (red lamp) will right again and the green indicator (green lamp) will now be extinguished.

Drawbacks of the known above mentioned device are the complexity of the electric circuit and its difficult embodiment for a manually operated drilling device for use in a home environment. The safety effect protecting the drilling device from damage is achieved by switching off the power of the device, and more importantly using relays to activate the light indicators which means that the light indicators are not self-contained ground indicators. As well, this device uses a transformer and rectifier, which makes it impossible to be installed in the drilling device.

The problem to be solved by the present invention is to provide an instantaneous registration and visual signalization of the moment of contact of the drilling device to the grounded metallic object.

An object of the present invention is to provide the person operating the drilling device with the possibility to remove the drill from the drilling location without the necessity to switch off the power from the device.

Another object of the present invention is to provide a drilling device made of most technologically suitable, simplified and inexpensive materials and elements comprising an easily constructed electrical circuit.

A further object of the invention is the possibility of the incorporating of the electrical circuit into the case of the drilling device without any changes in its external appearance and dimensions.

The embodiment and incorporation into the case of drilling devices of the above mentioned visual light indication is exceptionally important to the normal function of the drilling device, and can be carried out extremely easily and technologically correctly.

Another object of the present invention is to provide an improved safety protection circuit which has indicating means indicate contact of a drilling device tool with the grounded metal. The indicating means consists of: a power source, two conductors namely a hot wire and a ground wire, one neon bulb with a resistor, and two indicators. The first indicator is a red light emitting diode (red LED) and the second indicator is a green light emitting diode (green LED), and two diodes.

A further object of the present invention is to provide an improved safety protection circuit for use in conjunction with electrically-operated power tools such as drills.

Yet another object of the present invention is to provide a safety protection circuit in which the first indicator (red LED) has a lower voltage drop which is lower the voltage drop across the second indicator (green LED).

Both light emitting diodes are connected with common anodes to one end of the neon bulb. The second end of the neon bulb is connected to the hot wire from the power line through a resistor. The second indicator (green LED) cathode is connected to the ground wire from the power source.

The function of the neon bulb is to isolate the power line from the circuit, and by means of a resistor to supply low voltage to the (red LED) and (green LED).

The first indicator (red LED) cathode is connected to the metal body of the drill through a diode.

An indicating means is provided for visually displaying the operative condition of the tool. This indication is achieved with two LEDs which are integrated in such a way that the second indicator (green LED) drains from the first indicator (red LED). A small current which occurs when the bit of the drill is in concrete which has some conductivity, but that small current is not enough to power up the first indicator (red LED). This (red LED) is illuminated only when the current is large enough, which occur when the bit from the drill hits the grounded metal and the operator is informed that the drilling device is in contact with such object. Without the second indicator (green LED), the first indicator (red LED) starts to flash, even when the bit is in the concrete.

DETAILED DESCRIPTION OF THE PREFERRED EMBODIMENT

Figure 2:
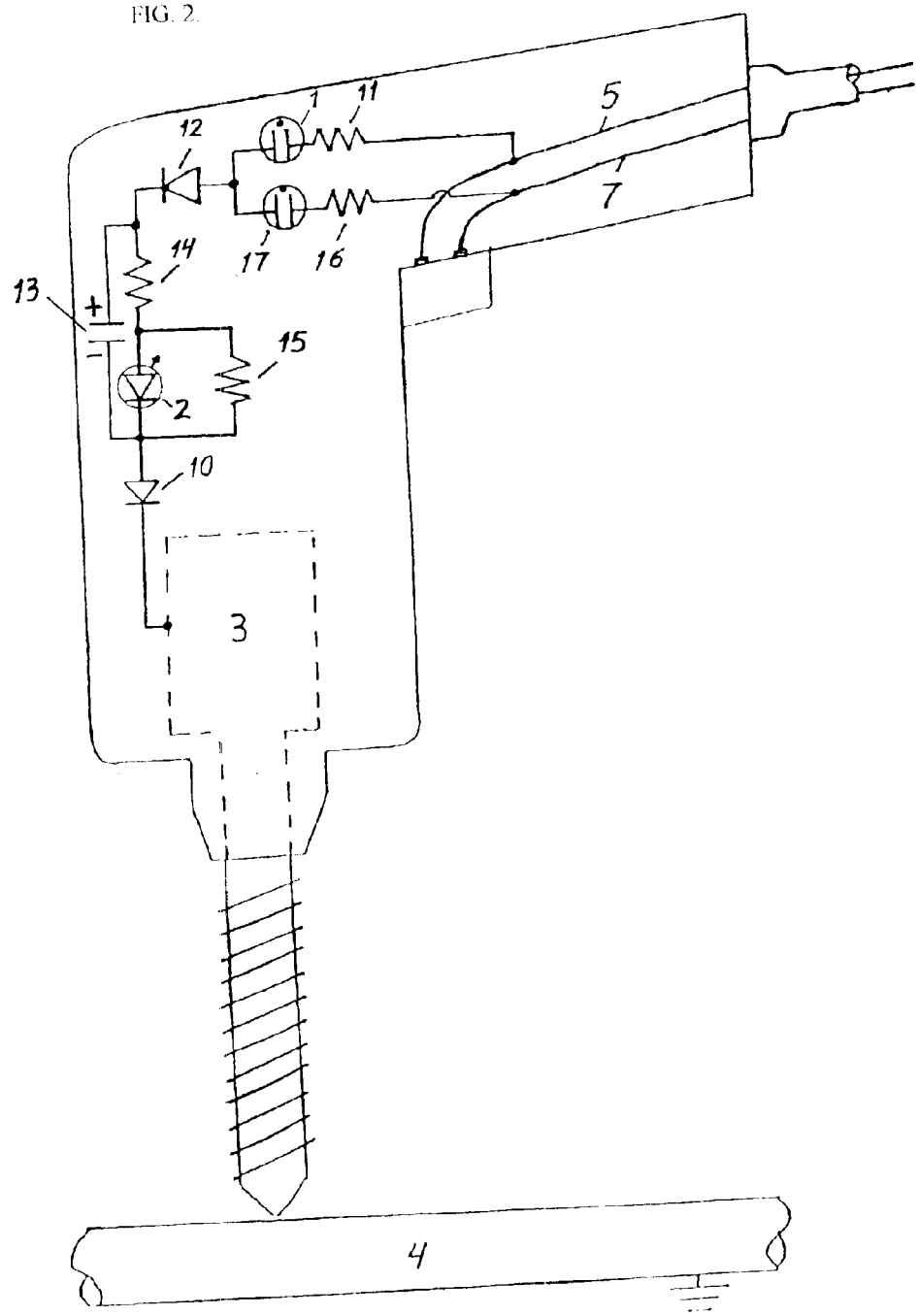

FIG. 1 shows a first embodiment of the invention, where the drill has three wires; and FIG. 2 shows a second embodiment of the invention where the drill has two wires.

The safety protection circuit of the present invention is described for use in conjunction with a drill which is utilized for penetrating in an electrically non-conductive material such as a concrete and an electrically conductive material such as a grounded metal.

Referring now in detail to the schematic diagram FIG. 1, the safety protection circuit is mounted in a housing. A Power to the circuit is provided through two conductors—hot wire 5 and building ground wire 6. The neon bulb 1 with resistor 11 is connected in series between the hot wire 5 and the common anodes on the red LED 2 and green LED 8.

The cathode of the green LED 8 is connected to the building ground wire 6 through diode 9. The functions of the neon bulb 1 and the resistor 11 are to isolate the power line from the circuit and to supply low voltage to the red LED 2 and green LED 8. The functions of the diode 9 and diode 10 are to protect the first indicator LED 2 and the second indicator LED 8 from reverse voltage.

There are two indicators: the first indicator is a red light emitting diode LED 2 and the second indicator is a green light emitting diode-LED 8. The red LED 2 has a voltage drop which is lower than the voltage drop across the green LED 8, and both are connected with common anodes to one end of the neon bulb. The second indicator green LED a cathode is connected to the building ground wire 6 through diode 9. The first indicator red LED 2 cathode is connected to the metal body of the drill and to the drive mechanism 3, and respectively to the drill bit, through diode 10.

The functions of the second indicator—green LED 8 are: first to show when it is illuminated that the safety protection circuit is powered up, and also respectively the power tool is powered up.

A second function is to show when it is illuminated that the safety protection circuit is powered up correctly because if for some reason the hot and neutral wire from the power source switched over, the safety protection circuit will not operate.

A third function when it is illuminated is to drain from the first indicator red LED 2 a small current which appears when the bit of the drill is in the concrete, which can provoke the red LED to flash. In this case the current flow is through the path with less resistance, which is the path throughout the second green indicator 8 instead of the path of the first red indicator 2, which is going through the higher resistance of the concrete.

Without the second green indicator 8 the first red indicator g starts to flash even when the drill bit is in the concrete, because there is no element which can drain this small current conducted through the concrete.

The function of the first indicator red LED 2 is: when it is flashing, is to indicate the moment of contact os of the drill bit with a grounded metal object. In this case the current is going through the path of the first red indicator 2, which path has less resistance than the path through the second green indicator. This causes the first red indicator 2 to flash.

There is a second way of detecting ground metal shown in FIG. 2, using only one of the wires from the power tool. In this case the hot wire can only be used for the safety protection circuit. The second method is different from the first method because a building ground wire is not needed to operate the safety protection circuit.

The second type of safety protection circuit comprises a single indicator red LED 2 connected at its anode to the low voltage power supply through first diode 12 and second resistor 14. That low voltage power supply comprises neon bulb 1 and first resistor 11. The cathode of the indicator red LED 2 is connected to the body of the drill through the second diode 10. The function of the first diode 12 is to rectify AC to DC voltage. The function of the second diode 10 is to protect from reverse voltage in case the bit hits a hot wire.

The safety protection circuit also comprises a capacitor 13 connected with its positive end in between the cathode of the first diode 12 and the second resistor 14.

The negative end of the capacitor 13 connected to the cathode of the indicator red LED 2. The function of the capacitor 13 is to charge quickly and to discharge slowly to steady the voltage across the indicator red LED 2.

The second resistor 14 one end in between the cathode of diode 12 and the positive end of the capacitor 13, and at other end it is connected in between the anode of the indicator red LED 2 and the third resistor 15. The function of the second resistor 14 is to allow the capacitor 13 to be charged fast and to discharge slowly.

Thus, a second function of the capacitor 13 is to keep the charge and to supply steady voltage across indicator red LED 2.

Third resistor is connected in between the anode and cathode on the indicator red LED 2.

The function of the third resistor 15 is to prevent the indicator red LED 2 to light up at low current which appears when the bit of the drill is in the concrete. Without resistor 15, indicator red LED 2 will light up when the drill bit is in the concrete, because the concrete has some conductivity.

Optionally, a second low voltage power supply may comprise a resistor 18 and neon bulb 17 which are connected in series to the neutral wire 7 and the anode of the diode 12. The function of this second low voltage power supply is to power up the safety protection circuit in case of the hot wire 6 and the neutral wire 7 have been reversed.

What is claimed is:

1. A safety protection circuit for indicating ground metal contact of an electrically operated power tool, comprising:
   a low voltage power supply connected at one end to the hot wire of a three-wire electrical power source for said electrically operated power tool, and at its other end to commonly connected anodes of first and second indicators;
   wherein the cathode of said first indicator is connected to the body of said electrically operated power tool through a first diode, and the cathode of said second indicator is connected to the ground wire of a three-wire electrical power source for said electrically operated power tool through a second diode;
   wherein said first indicator will indicate to the operator of said power tool when it has contacted grounded metal, in use, and said second indicator will indicate to the operator of said power tool that the tool is powered properly;
   wherein the voltage drop across said first indicator has a first magnitude, and the voltage drop across said second indicator has a second magnitude, and wherein said first magnitude is equal to or less than said second magnitude; and
   wherein said low voltage power supply includes an isolating means for isolating the power source for said electrically operated power tool from said safety protection circuit.

2. A safety protection circuit as claimed in claim 1, wherein said isolating means comprises a neon bulb.

3. A safety protection circuit as claimed in claim 1, wherein said low voltage power supply includes a resistor.

4. A safety protection circuit as claimed in claim 1, wherein said first LED indicator means comprises a red light emitting diode.

5. A safety protection circuit as claimed in claim 1, wherein said second LED indicator means comprises a green light emitting diode.

6. A safety protection circuit as claimed in claim 1, wherein each of said first and second indicators is an LED.

7. A safety protection circuit for indicating ground metal contact of an electrically operated power tool, comprising:
   first and second indicators connected at a first end of each to the hot wire of an electrical power source for said electrically operated power tool; and
   the second end of said first and second indicators being connected to the body of said electrically operated power tool;
   wherein the voltage drop across said first indicator has a first magnitude, and the voltage drop across said second indicator has a second magnitude, and wherein said first magnitude is less than said second magnitude;

whereby, when said power tool has contacted ground metal, said second indicator is illuminated.

8. A safety protection circuit as claimed in claim 7, wherein each of said first and second indicators is a neon bulb in series with a resistor.

9. A safety protection circuit for indicating ground metal contact of an electrically operated power tool, comprising:

a first low voltage power supply comprising a first neon bulb and a first resistor, adapted to be connected to one side of a two-wire electrical power source for said electrically operated power tool;

a second low voltage power supply comprising a second neon bulb and a second resistor, adapted to be connected to the other side of a two-wire electrical power source for said electrically operated power tool;

an LED indicator connected at its anode through a third resistor and a first diode to said first and second low voltage power supplies, wherein the anodes of each of said LED indicator and said first diode are both electrically facing said first and second low voltage power supplies;

wherein the cathode of said LED indicator is connected to the body of said electrically operated power tool through a second diode;

a capacitor connected at its positive end to the junction between the anode of said first diode and said third resistor, and at its second end to the junction between the cathode of said LED indicator and the anode of said second diode; and a fourth resistor connected across said LED indicator.

* * * * *